May 14, 1946.  C. A. MABEY  2,400,427

MEASUREMENT AND CONTROL OF HUMIDITY

Filed Aug. 15, 1941

INVENTOR.
Charles A. Mabey
BY
E. C. Sanborn
his attorney

Patented May 14, 1946

2,400,427

UNITED STATES PATENT OFFICE 2,400,427

MEASUREMENT AND CONTROL OF HUMIDITY

Charles A. Mabey, Waterbury, Conn., assignor to The Bristol Company, Waterbury, Conn., a corporation of Connecticut Application August 15, 1941, Serial No. 407,017

11 Claims. (Cl. 73—74)

This invention relates to the determination of humidity, and more especially to an apparatus in which measurement of humidity is determined on the basis of the quantity of dry gas required to adjust to a standard condition a predetermined quantity of gas of the humidity to be measured.

Methods of humidity measurement depending on changes in physical dimensions of hygroscopic materials are generally based on the assumption that said changes are a function of per cent relative humidity and that effects of the temperature and pressure of the atmosphere being measured are of a second order of magnitude and may be neglected. It is known, however, that such methods are subject to the following limitations:

(a) The relation between humidity value and mechanical deflection is essentially non-linear.

(b) The second-order effects of temperature and pressure are not always negligible, and over the ranges of variation met with in practice may have an appreciable bearing on the indications.

(c) All hygroscopic materials possess a certain degree of hysteresis, so that the response depends upon the direction from which a given condition is approached.

(d) When such materials are subjected to extremely high, or extremely low, humidity values, or to mechanical strains, they are likely to acquire permanent changes.

(e) As the response of such materials to a change in conditions follows an essentially exponential law with respect to time, a considerable interval is likely to elapse before a condition of equilibrium with surrounding atmosphere can be completely established.

It is an object of this invention to provide a humidity measuring apparatus which shall be substantially free of the above-listed objections.

It is a further object to provide an apparatus of this class which shall be readily applicable to the control of humidity in atmospheres or moisture content of materials.

It is proposed, in carrying out the invention, to make use of a hygroscopic element only as a detector of small humidity changes in a limited atmosphere surrounding it, and to utilize the response of said element to control the proportioning of an admixture of dry gas with the gas whose humidity condition is to be measured, and so maintain a substantially constant humidity condition in the atmosphere at the sensitive element. It can be shown that with such a combination, if the volume of the unknown gas be constant, the humidity condition thereof may be directly measured by the volume of the dry gas which it is necessary to add in order to maintain the mixture at a constant humidity.

Experience has shown that the initial response of many hydroscopic materials to humidity conditions is very rapid, and that the above-mentioned undesirable effects are minimized or entirely negligible when the atmosphere surrounding the material is permitted to make only small variations from a fixed humidity value.

Figure 1:
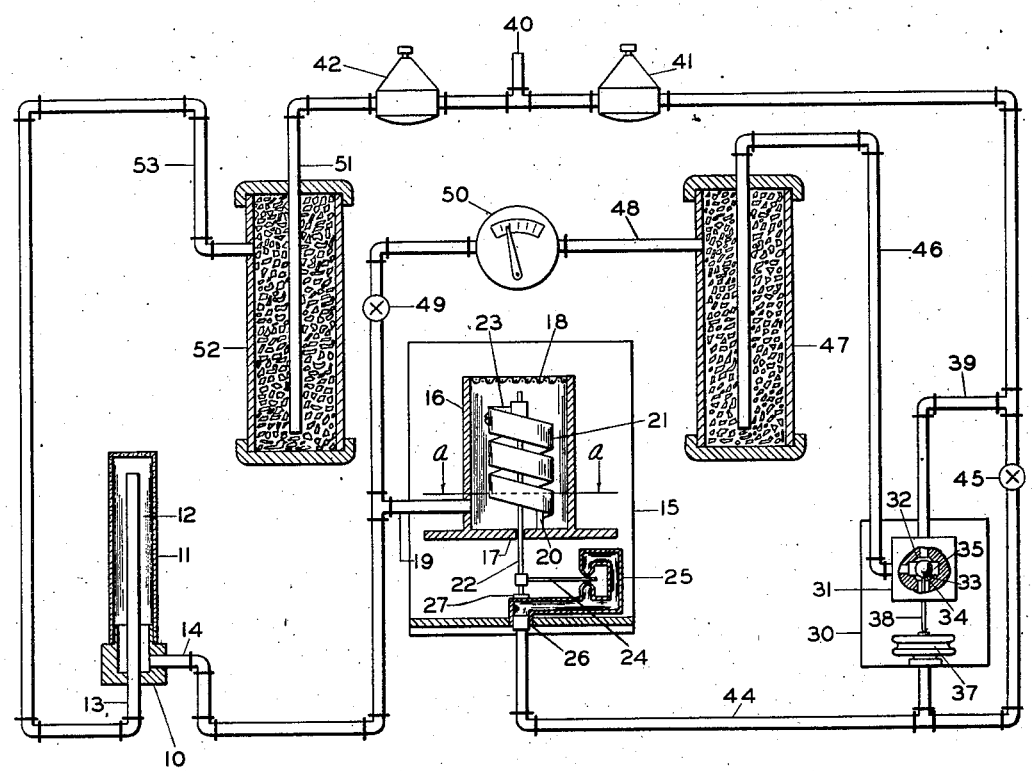
Fig. 1 is a digrammatic representation, partly in section, illustrating a humidity measuring apparatus embodying the principles of the invention.

Referring now to the drawing, the numeral 10 indicates a cup-shaped metallic base member having fitted thereto a tube 11 having a very thin wall of unglazed porcelain or similar porous or foraminous material, the same being closed at one end and forming with the base member 10 an enclosed chamber 12. A conduit 13 passing through a wall of the base member 10 extends throughout the length of the tube 11, forming means for the admission of dry gas to the chamber 12. The conduit 14 also passing through a wall of member 10 forms an outlet for said gas.

Figure 2:
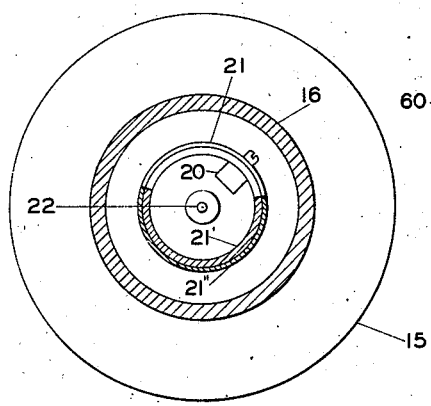
Fig. 2 is a sectional view of an element of the invention, taken on the line a—a in Fig. 1, and to a somewhat enlarged scale.

Mounted upon a base plate 15 is a chamber 16 of substantially cylindrical conformation and having one end substantially closed by a flat wall 17 and the other end covered by a screen 18. A conduit 19 passing through the wall of chamber 16 provides for admission thereto of a stream of gas. Mounted within the chamber 16 is a hygroscopic element 21 responsive to the moisture content of the atmosphere within the chamber. The element 21 may effectively be of the form shown in section in Fig. 2, consisting of a member made up of a layer of hygroscopic material 21' such as treated wood, and a layer of non-hygroscopic material 21", such as thin flexible metal, said layers being cemented or otherwise secured together to form a compound strip, and said strip being formed into a helix and mounted upon a stud 20 attached to the wall 17. By virtue of the material and conformation of said element, the same will respond to changes in the humidity of the atmosphere to which it is exposed, and will tend to deflect in the sense that its free end will travel in a more or less circular arc about the axis of the helix.

Mounted coaxially with the element 21 and free for rotation about said axis is a spindle 22 attached to said hygroscopic element as by a radial arm 23, and thereby adapted to partake of rotation communicated thereto by changes in humidity. The spindle 22 extends coaxially to the chamber 16 through an opening in the wall 17 and carries a light vane member 24 adapted to swing between opposed orifices of a nozzle member 25, whereby, by virtue of its position with respect to said orifice, the escape of gaseous fluid therefrom may be more or less obstructed. The combination of the vane 24 and the nozzle member 25 constitutes a control couple identical with that fully set forth and claimed in U. S. Letters Patent No. 1,880,247, issued October 4, 1932, to H. L. Griggs and A. R. Mabey. The member 25 may expediently be journaled in a pivot bearing 26; and the spindle 22 may be mounted in a pivot bearing 27, both said bearings being disposed coaxially to the hygroscopic element 21, whereby the vane 24 will be arcuately deflected with changes in the humidity of element 21 and the member 25 may be adjusted with respect to the position of the vane 24.

Mounted upon a base plate 30 is a pilot valve 31 of the supply-and-waste type, having two seat portions 32 and 33, and a seating member 34 adapted alternatively to engage said seat portions. The member 34 rests in a cavity 35 determined by the seat portions 32 and 33. A capsular spring or bellows 37 mounted upon the base plate 30, and adapted to actuate the seating member 34 by means of a stem 38, provides means for varying the position of said seating member with respect to said seat portions. Coaction between the seating member 34 and the seat portion 32 controls communication between the cavity 35 and a conduit 39. Coaction between the seating member 34 and the seat portion 33 controls communication between the cavity 35 and an annular vent surrounding stem 38 and leading to the atmosphere.

Gaseous fluid, which may be compressed air or other gas suited to the purpose in hand, is obtained from a pressure source 40 and conducted to the inlets of two reducing valves 41 and 42 of the conventional type, by which there may be maintained at the outlet sides of said valves predetermined and constant pressures lower than the pressure at the inlet side. The outlet side of valve 41 communicates directly with conduit 39, whereby gaseous fluid from said reducing valve may be admitted to said cavity and the pressure therein made subject to regulation, according to the extent to which the seating member 34, by its position in said cavity with respect to the seat portions 32 and 33, modifies the relative communication of said cavity with the conduit 39 and with the atmosphere. The bellows 37 is directly connected to the orifice member 25 by means of a conduit 44 which in turn communicates with conduit 39 through a constriction or orifice-plate 45. A conduit 46 communicating with the cavity 35 in the valve 31 passes into a drier 47 which may consist of a closed container filled with moisture absorbent material such as calcium chloride so disposed as to permit free passage of gas therethrough in intimate contact with said material. A conduit 48 leading from the outlet of the drier 47 communicates through a constriction or orifice-plate 49 with the conduit 19 connected to the interior of chamber 16 containing the hygroscopic element 21. The constriction 49 cooperates with the regulator 31 in maintaining a steady flow of dry gas into the conduit 19. A flow meter 50, connected in the conduit 48 provides an indication of the rate of flow of gas therethrough. Or, since the gas in the conduit 19 is at all times at substantially atmospheric pressure, a pressure gauge connected to the conduit 48, providing a measure of the pressure drop through the orifice or constriction 49, may be used as a means of determining the rate of flow through said orifice, and hence from the drier 47 to the conduit 19.

From the outlet side of reducing valve 42 a conduit 51 leads to the interior of a drier 52 similar in all respects to the drier 47; and the outlet side of said drier communicates directly with conduit 13 providing for admission of gas to the chamber 12.

The operation of the device is as follows: The porous tube 11 is placed in the atmosphere whose humidity it is desired to measure, and by virtue of the property of absorption will assume a moisture condition corresponding to said humidity. The reducing valve 42 is adjusted to regulate an outflow of air or other gas to a very low pressure, just sufficient to maintain a continuous flow through the drier 52 and the chamber 12 into the chamber 16, containing the hygroscopic element. The stream of gas passing through the chamber 12 and coming into intimate contact with the interior surface of the tube 11 will have imparted to it a moisture content representative of the moisture condition of the tube 11, and therefore of the temperature to which said tube is exposed. This stream of gas will enter the chamber 16 but, because of the free communication of said chamber with the atmosphere, will not appreciably increase above atmospheric value the pressure therein, and will tend to affect the angular position of the humidity-sensitive element 21, and therefore of the vane 24.

The action of the control system commanded by the position of the vane 24 is fully set forth in the above-mentioned Patent No. 1,880,247. This action may be briefly recapitulated as follows: gas is delivered at a low pressure (for example, 15 pounds per square inch) from the reducing valve 41 into the conduit 39, and through the constriction 45 to the conduit 44 communicating with capsular spring 37 and the orifice member 25. By virtue of the constriction 45 the pressure in the conduit 44 and elements directly connected thereto will depend upon the amount of obstruction to the escape of gas from the member 25 provided by the vane 24. In other words, change in the position of the vane 24 with respect to the orifice member 25 will affect the back pressure in the conduit 44, therefore, in the bellows 37. Gas from the conduit 39 will pass the seating element 32 into the cavity 35 and thence into the conduit 46. The amount of flow from the conduit 39 to the conduit 46 will be governed by the position of the seating member 34 in relation to the seating elements 32 and 33, controlling communication of the conduit 46 with the conduit 39 and the atmosphere respectively. Thus, the amount of gas supplied to the conduit 46 will become a function of the position of the vane 24, and therefore of the humidity of the atmosphere within the chamber 16.

Gas admitted to the conduit 46 through the valve 31 will pass through the drier 47, and thence through the conduit 48 and the constriction 49 to the conduit 19, where it will be mixed with the stream of gas coming from the chamber 12 through the conduit 14. The humidity of the gas within the chamber 16 will then represent that of a mixture of gas having a humidity value to be measured and gas having a constant, and extremely low, humidity value. In operation, the control element is given an initial setting by means of adjustment of the member 25 about its axis of rotation, so that the pneumatic control system will tend to regulate the flow of dry gas in a manner to maintain the gaseous mixture in the chamber 16 at a predetermined humidity value. This setting will depend on the range of humidity in which it is desired to make measurement. With the sample gas passing through the chamber 16 from the chamber 12, any change in the humidity value of said gas will operate the vane 24, and hence the pilot valve 31, in a sense to vary the amount of gas supplied through the conduit 48 and the constriction 49 to bring the humidity in the chamber 16 back to the original setting. By virtue of the constriction 49 between the conduits 48 and 19, the static pressure as measured by the gauge 50 will be a function of the flow of gas through the constriction 49 and therefore of the amount of gas required to maintain the humidity in the chamber 16 at the predetermined value. As has already been pointed out, the amount of gas required to mix with the sample in order to maintain a substantially constant humidity value within the chamber 16 is a direct measure of the moisture content of said sample. Thus, the reading of the pressure gauge 50 becomes a measure of the humidity of the atmosphere to which the external surface of the porous tube 11 is exposed.

While the invention has been pointed out in its application to obtaining the measurement of humidity in the form of an indication as by an index on a graduated scale, it is obvious that the instrument 50 may be replaced or supplemented by a recording instrument to provide a continuous graph of humidity values; or the measurement of pressure in the conduit 48 may be made the basis of action of an automatic controlling instrument tending to maintain the measured humidity at a predetermined value.

Figure 3:
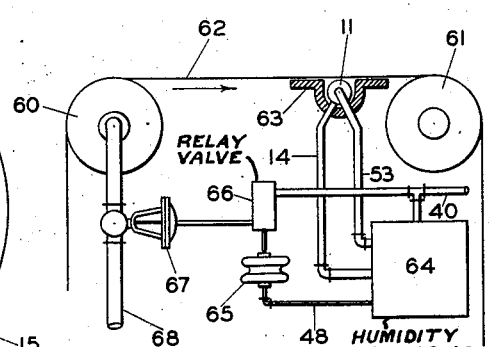
Fig. 3 is a diagram showing an application of the principles of the invention to the control of moisture content in the traveling web of hygroscopic material.

In Fig. 3 is shown an application of the principles of the invention to control the moisture condition in a web of hygroscopic material, such as paper or the like, during the course of manufacture.

Between two rolls 60 and 61 is caused to pass in the direction of the arrow a continuous web 62 of paper or similar hygroscopic material undergoing a manufacturing process. Closely juxtaposed to the surface of the web 62 is a chamber 63 having an open side facing the web and containing a humidity sensitive element which may be the tube 11 of Fig. 1. The numeral 64 designates a humidity measuring apparatus which may be identical in all respects with that hereinbefore described in conjunction with the tube 11 in Fig. 1; said apparatus being connected to tube 11 through conduits 14 and 53, and receiving a supply of air or other gaseous medium from a source 40, all of which has been fully set forth and explained. The conduit 48 is extended to include a pressure sensitive capsular spring or bellows 65 adapted to actuate a relay valve 66 in a manner to admit more or less pressure fluid from the source 40, or other convenient source, to a diaphragm actuated valve 67 connected in a pipe 68 adapted to admit steam or other drying medium to the interior of the roll, whereby the moisture content of the web as it leaves said roll may be affected.

The operation of this device is as follows: the tube 11 being juxtaposed to the web 62, will partake of its moisture condition, which being determined by the instrument 64 as hereinbefore explained, will cause to be developed in the conduit 48 a pressure which will be a measure of the moisture content of the web 62. Should the moisture content of said web rise above a predetermined value, the pressure of the gaseous medium in the conduit 48, being communicated to the capsular spring 65, will cause the relay valve 66 to modify the pressure applied to the diaphragm 67 in a sense to increase the supply of drying medium through the pipe 68 to the interior of the roll 60. In a similar manner, should the moisture content of the web 62 tend to decrease, the flow of drying medium through the conduit 68 will be modified in a sense to restore the web 62 to a normal and predetermined moisture content. Thus, there has been provided automatic means whereby a humidity measuring unit of the class described may be directly adapted to control of the humidity under determination.

While, for purposes of clarity, the terms "humidity" and "moisture content" have herein been considered as referring only to the amount of water vapor carried in air or some other gas, it is understood that the term is essentially of much broader application, and should be construed in its most comprehensive sense. For the purposes of this invention, said terms are to be understood as relating to the presence of any condensible vapor in a gas or in a mixture of gases. Furthermore "humidity," as employed herein, means "per cent relative humidity" which is defined as the ratio, in per cent, of the amount, or partial pressure, of the condensible constituent of a gas or mixture of gases under given conditions of temperature to the maximum amount, or maximum partial pressure, of such condensible constituent possible for saturatiin at the given temperature.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. Apparatus for determining the moisture content of a medium, comprising humidity-responsive means, means for supplying to said humidity-responsive means a mixture comprising the first-mentioned medium together with a second medium having a predetermined moisture content, means controlled by said humidity-responsive means to regulate the flow of said second medium for maintaining the mixture of said media at a substantially constant and predetermined moisture content intermediate that of said first and second media, and means responsive to the flow of said second medium for pro- viding a measurement of the moisture content of said first medium.

2. Apparatus for determining the moisture content of a medium, comprising an enclosure in free communication with the atmosphere, a humidity-responsive device in said enclosure, a second medium at a pressure above atmospheric and having a predetermined moisture content, means for applying to said enclosure to affect said device a mixture of said media, means controlled by said humidity-responsive means to regulate the flow of said second medium for maintaining the mixture of said media at a substantially constant and predetermined moisture content intermediate that of said first and second media, and means responsive to the flow of said second medium for providing a measurement of the moisture content of said first medium.

3. In combination, means for feeding a web of material, means for imparting to a medium under pressure a moisture content corresponding with that of said material, means for effecting mixture of a second medium under pressure with said first-named medium, regulating means responsive to the moisture content of said mixture to control the pressure of said second medium, and thereby the proportions of said media in said mixture, and means positioned in response to the magnitude of said pressure.

4. Apparatus for determining the moisture content of a medium, comprising a chamber having a porous wall exposed to said medium and adapted to assume a condition corresponding to said moisture content, means for passing through said chamber a substantially constant flow of a medium of low moisture content to be affected by said condition, a second chamber, means for conducting said affected medium to said second chamber, means for admitting to said second chamber a further medium for admixture with said affected medium, together with means sensitive to the moisture content of said mixture for controlling the rate of admission of said further medium, and means responsive to said rate of admission for providing a measurement as an index of the moisture content of said first-mentioned medium.

5. Apparatus for determining the moisture content of a medium, comprising a chamber having a porous wall exposed to said medium, means for passing through said chamber a stream of dry gaseous medium, whereby said dry medium may partake of the condition of said wall, means for providing a second stream of said dry medium unaffected by said condition, means for producing a mixture of said streams at substantially atmospheric pressure, a moisture sensitive element exposed to said mixture and regulating means responsive to said moisture sensitive element for controlling the volume of said second stream, and means responsive to the flow of said second stream for providing a measurement as an index of the moisture content of said first-mentioned medium.

6. In an apparatus for determining the moisture content of a gaseous medium, means providing a substantially continuous stream of said medium, means for admitting to said stream a quantity of a similar medium of substantially different moisture content to produce a mixture of said media, a chamber adapted to contain a body of said mixture at substantially atmospheric pressure, a moisture sensitive element in said chamber and exposed to said mixture, and means actuated by said element to control the rate of admission of said similar medium.

7. Apparatus for determining the moisture content of a medium, comprising a chamber having a porous wall exposed to said medium, means supplying two streams of a gaseous medium, means for reducing the medium constituting each of said streams to a state of low moisture content, means for causing one of said streams to pass at a substantially constant rate through said chamber to assume a moisture content corresponding to the condition of said wall, means for causing the other of said streams to mix with the first-mentioned stream after passage through said chamber, means for regulating the rate of flow of said other stream, means responsive to the moisture condition of the mixture to control said regulating means, and means responsive to the flow of said other stream to provide a measurement as an index of the moisture content of said first-mentioned medium.

8. Apparatus for determining the moisture content of a medium, comprising a chamber having a porous wall exposed to said medium, means supplying two streams of a gaseous medium at pressures above atmospheric, means for reducing the medium constituting each of said streams to a state of low moisture content, an enclosure in free communication with the atmosphere, means for causing one of said streams to pass at a substantially constant rate through said chamber to assume a moisture content corresponding to the condition of said wall and thence to pass into said enclosure, regulating means for causing the other of said streams to pass into said enclosure to mix therein with the first-mentioned stream, to form a mixture at substantially atmospheric pressure, means responsive to the moisture condition of the mixture to control said regulator means, and means responsive to the flow of said other stream for providing a measurement as an index of the moisture content of said first-mentioned medium.

9. Apparatus for determining the moisture content of a medium, comprising a chamber having a porous wall exposed to said medium, means supplying two streams of a gaseous medium, means for reducing the medium constituting each of said streams to a state of low moisture content, means for causing one of said streams to pass at a substantially constant rate through said chamber to assume a moisture content corresponding to the condition of said wall, means for causing the other of said streams to mix with the first-mentioned stream after passage through said chamber, means for regulating the rate of flow of said other stream, means responsive to the moisture condition of the mixture to control said regulator means to cause said regulator means to control said other stream in a manner to maintain said mixture at a substantially constant moisture content, and means responsive to said flow of said other stream for providing a measurement as an index of the moisture content of said first-mentioned medium.

10. Apparatus for determining the moisture content of a medium, comprising a chamber having a porous wall exposed to said medium, means supplying two streams of a gaseous medium, means for reducing the medium constituting each of said streams to a state of low moisture content, means for causing one of said streams to pass at a substantially constant rate through said chamber to assume a moisture content corresponding to the condition of said wall, means for causing the other of said streams to mix with the first-mentioned stream after passage through said chamber, means for regulating the rate of flow of said other stream, means responsive to the moisture condition of the mixture to control said regulator means to cause said regulator means to control said other stream in a manner to maintain said mixture at a substantially constant moisture content, together with means for measuring the rate of supply of said gaseous medium in said other stream as an index of the moisture content of said first-mentioned medium.

11. In a humidity meter, the combination of means for producing a constant stream of gaseous fluid of a humidity to be measured, means comprising a regulator for producing a regulated stream of gaseous fluid of a moisture content less than that of the first-named fluid, means for producing a mixture of said streams, a hygroscopic element exposed to said mixture to be influenced by the humidity thereof, means actuated by said hygroscopic element to control said regulator to produce a regulated stream to maintain the mixture at a substantially constant humidity and means responsive to the flow of said regulated stream for providing a measurement as an index of the moisture content of the first-mentioned stream.

CHARLES A. MABEY.